N. ERICSON.
GRAPE FRUIT HOLDER.
APPLICATION FILED JUNE 22, 1915.

1,180,119.

Patented Apr. 18, 1916.

Inventor
Nils Ericson.

Witnesses
Fredrick W. Ely.

By Victor J. Evans
Attorney

UNITED STATES PATENT OFFICE.

NILS ERICSON, OF GIBSON, INDIANA.

GRAPE-FRUIT HOLDER.

1,180,119.   Specification of Letters Patent.   Patented Apr. 18, 1916.

Application filed June 22, 1915. Serial No. 35,730.

*To all whom it may concern:*

Be it known that I, NILS ERICSON, a subject of the King of Sweden, residing at Gibson, in the county of Lake and State of Indiana, have invented new and useful Improvements in Grape-Fruit Holders, of which the following is a specification.

My invention relates to a device designed especially for table use in holding a half or section of a divided grape fruit so that the fruit can be held conveniently in one hand while portions thereof are being removed for consumption by means of a spoon or other suitable article held in and manipulated by the other hand.

The object of the invention is to provide a holder of simple construction by means of which a section of an eatable fruit of the character described may be held and clamped in a secure manner, and in such a way as to avoid the juice of the fruit from coming in contact with the hand or clothes of the wearer.

A further object of the invention is to provide a holder of the character and for the purpose described which may be made as simple or ornamental as desired, and which may be applied to the section of fruit and removed from the remaining skin in an easy and convenient manner.

The invention consists of the features of construction, combination and arrangement of parts herein fully described and claimed, reference being had to the accompanying drawing in which:—

Figure 1:
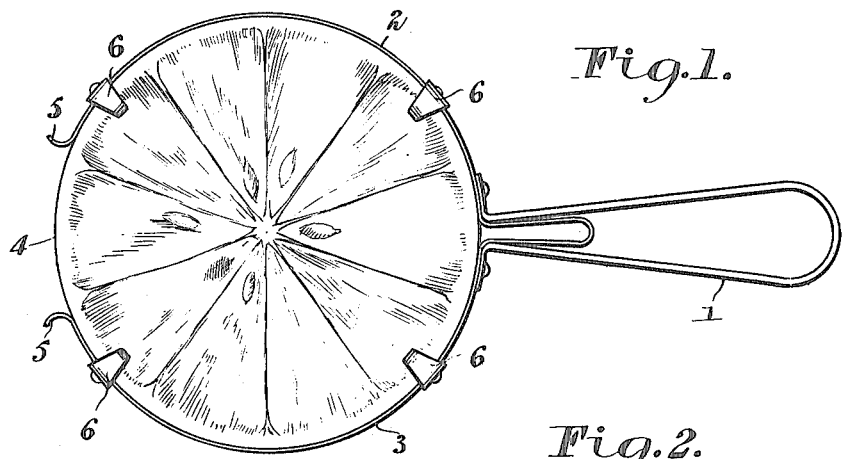
Figure 2:
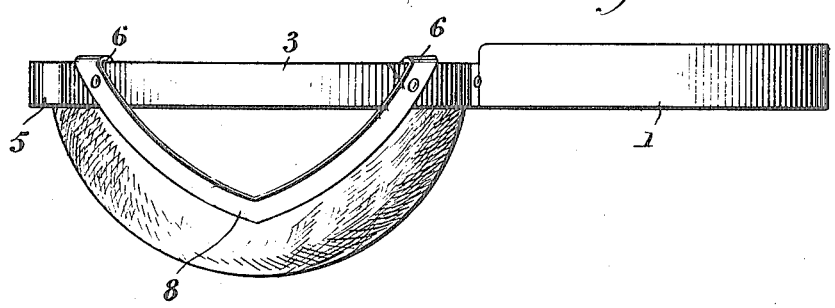
Figure 3:
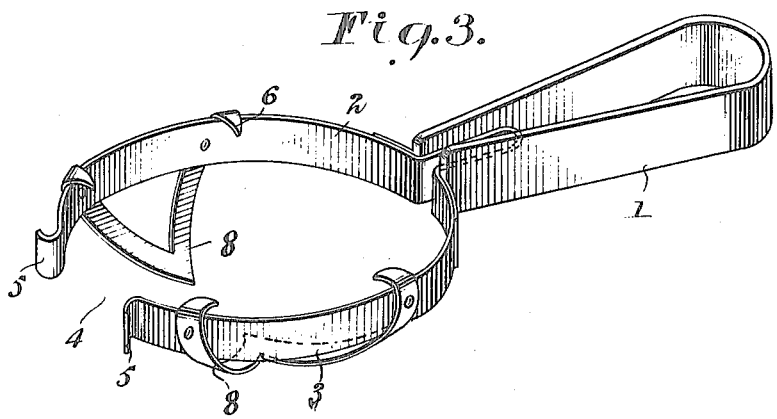

Figure 1 is a top plan view showing the device as used for holding a half section of grape fruit. Fig. 2 is a side elevation of the same. Fig. 3 is a perspective view of the device *per se.*

The holder may be, and preferably is, formed of a single piece of spring metal, although it may be constructed of one or more pieces or sections of the same or different metals, as desired. In the present instance I have shown the device constructed as made of several pieces of metal, primarily stamped out and afterward bent into proper form. As shown, the holder comprises a looped handle 1 and a pair of oppositely disposed jaws 2 and 3, the arms of the handle as well as the respective jaws being adapted to spread under pressure to a predetermined extent and then to contract by their resiliency or spring action. The jaws have their rear ends, which extend from the handle, in close proximity and are curved on arcs which are somewhat less than semicircles, the opposite or free ends of the jaws being spaced to provide an entrance way or passage 4 to and from the space between the jaws, the extremities of the jaws being provided with outwardly and laterally bent guards 5 which are adapted to facilitate the insertion of the fruit and provide blunt surfaces of a character not liable to injure the hands or clothing of the user.

In practice, the article of fruit is severed into halves in the usual way, and one of the halves or sections is placed in the holder, which is preferably accomplished by moving the holder forward so that the guards 5 contact with the skin of the fruit, so that by moving the holder under a determined pressure the jaws will spread to allow the fruit to pass between them and will then close about the fruit to securely hold the same. In order to hold the fruit against upward or outward movement the jaws are provided with inwardly and downwardly projecting spurs 6, which overhang the marginal edge of the skin of the fruit and may embed themselves slightly into the pulp of the fruit to prevent the latter from shifting toward the free ends of the jaws. The fruit is held against any possibility of downward movement or displacement under its own weight by supporting members 8, preferably of the form shown, which project from the jaws downwardly and inwardly on desired arcs of curvature so as to extend under and support the fruit in an efficient manner.

By the use of the holder constructed as described a portion of grape fruit which is to be served for consumption at the table may be easily placed in position and held conveniently while it is being eaten, without liability of the fruit being displaced under the pressure of the spoon while the latter is being used, or of the juice squirting or being forced out on to the hand or clothes of the wearer, as occurs when the fruit is held in one hand while the other is being employed to manipulate the spoon. The advantages of the device as a table article will thus be readily understood. It will of course be apparent that the holder may be nickel-plated, silver-plated or otherwise rendered rust-proof and of attractive appearance, and that it may also be made to a greater or less degree ornamental to suit the taste or fancy of the user.

I claim:—

1. A grape fruit holder comprising a pair of substantially semi-circular spring jaws having their free ends separated to provide entrance passage to the space between the jaws, a handle connected with the jaws at a point diametrically opposite said passage, spaced gripping spurs upon the respective jaws projecting inwardly on radial lines from the upper surfaces of said jaws, and downwardly and inwardly curved retaining elements upon the respective jaws extending toward a point beneath the center of the space between said jaws.

2. A grape fruit holder comprising a pair of substantially semi-circular spring jaws having their free ends separated to provide an entrance passage to the space between the jaws, a handle connected with the jaws at a point diametrically opposite said passage, and a pair of V-shaped members secured to the respective jaws, said members having their vertex portions extending on curved lines beneath the jaws and inwardly toward a point beneath the center of the space between said jaws, and having their arms projecting inwardly above said jaws and terminating in spurs.

In testimony whereof I affix my signature in presence of two witnesses.

NILS ERICSON.

Witnesses:
J. RIEDL,
F. BARTLETT.